United States Patent Office 3,102,913
Patented Sept. 3, 1963

3,102,913
PROCESS FOR PREPARING m-(DI-LOWER-ALKYLAMINO)PHENOLS
Raymond E. Werner, Cincinnati, Ohio, assignor to Sterling Drug Inc., New York, N.Y., a corporation of Delaware
No Drawing. Filed June 27, 1960, Ser. No. 38,712
3 Claims. (Cl. 260—574)

This invention relates to the preparation of m-(di-lower-alkylamino)phenols.

The m-(di-lower-alkylamino)phenols are known to be valuable starting materials for the preparation of whitening and brightening agents, particularly 4-methyl-7-(di-lower-alkylamino)coumarins, and for the preparation of certain dyes of the xanthene type, such as rhodamines, pyronines, rosamines, and sacchareins.

The new process of the instant invention for producing m-(di-lower-alkylamino)phenols comprises heating resorcinol, a di-lower-alkylamine, and boric acid together in an aqueous medium. The reaction involved is represented by the following equation:

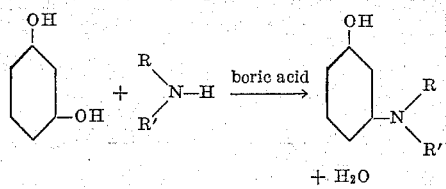

wherein R and R' are lower alkyl, particularly alkyl containing one to four carbon atoms each, for instance methyl, ethyl, n-propyl, isopropyl, n-butyl, and the like.

A particular advantage of the process of the instant invention is that, in contrast with the previously available methods for condensing resorcinol and dialkylamines, it does not involve the handling of any corrosive acids.

My new process is conveniently carried out by mixing the resorcinol, di-lower-alkylamine, boric acid, and water in any desired order, and heating the resulting mixture in an autoclave at a temperature in the approximate range 150–250° C., and preferably about 175–225° C., until the reaction is complete. The reaction time varies somewhat with the temperature employed, of course. For instance, a period of ten to twelve hours has been found to be ordinarily sufficient at 200° C., and at 225° C. six hours was usually sufficient. After cooling, the autoclave is opened and the m-(di-lower-alkylamino)phenol is isolated from the reaction mixture in any desired fashion.

For many purposes, the crude product obtained by distilling the water from the reaction mixture containing the m-(di-lower-alkylamino)phenol is useful without further purification. When a purer product is desired, the conventional purification procedures, such as fractional distillation, can be employed.

The di-lower-alkylamines, RR'NH, used in the process of my invention include, for example, dimethylamine, diethylamine, N-methyl-N-ethylamine, di-n-propylamine, diisopropylamine, N-methyl-N-butylamine, diisobutylamine, and the like. These amines can be used either as such or, if desired, in the form of aqueous solutions.

The di-lower-alkylamine and the resorcinol are of course required in equimolecular quantities by the equation hereinabove. However, in carrying out the process, the exact proportions of the reactants employed are not critical, and the reaction proceeds satisfactorily in the presence of an excess, for instance up to about 100 mole percent or more, of either of the two reactants. Ordinarily, I prefer to employ about one to one and one-half moles of the di-lower-alkylamine per mole of resorcinol.

Only a relatively small proportion of boric acid is required in the process, and as little as 0.01 mole of boric acid per mole of resorcinol affords satisfactory results. There is no critical upper limit to the amount of boric acid, and varying amounts of boric acid, for insetnce up to one mole of boric acid per mole of resorcinol, have been used without any substantial effect on the yield of m-(di-lower-alkylamino)phenol. Since the use of the larger proportions offers no particular advantage, however, I usually prefer to use about 0.02–0.2 mole of boric acid per mole of resorcinol.

The amount of water employed in the reaction mixture is not critical, but advantageously is sufficient to dissolve the other components of the mixture.

My invention is illustrated by the following examples without, however, being limited thereto.

EXAMPLE 1 m-(Dimethylamino)Phenol (A) A mixture of 1320 pounds of resorcinol, 1680 pounds of a 40 percent aqueous solution of dimethylamine, 90 pounds of boric acid, and 900 pounds of water was heated slowly to 200° C. in an autoclave with agitation. (The approximate respective molar proportions of resorcinol:dimethylamine:boric acid were 1:1.25:0.12.) The pressure at 200° C. was about 300 pounds per square inch. The mixture was maintained at 200° C. and agitated for twelve hours. After cooling and opening the autoclave, the reaction mixture was heated to distill off the water, and the resulting residue was heated at 130–140° C. until it was free of the odor of dimethylamine. The crude product thus obtained, which weighed 1500 pounds, was distilled under reduced pressure. The fraction distilling at 182° C. at 30 mm. weighed 1200 pounds. This product was m-(dimethylamino)phenol of about 86 percent purity melting at 65–72° C. The product obtained in this manner was interacted with ethyl acetoacetate to yield 4-methyl-7-(dimethylamino)coumarin.

(B) The procedure of part A above was repeated with substantially the same results when in one instance 670 pounds of dimethylamine and 1010 pounds of water were substituted for the 40 percent dimethylamine solution and in another instance 2680 pounds of a 25 percent aqueous solution of dimethylamine was substituted for the 40 percent dimethylamine solution.

(C) In another preparation of m-(dimethylamino)phenol, following the same reaction conditions as those described in part A, the aqueous reaction mixture was cooled, removed from the autoclave, and then there were added hot water and sufficient sodium chloride to cause the separation of the mixture into two layers, a red oil as an upper layer and a lower, aqueous layer. The aqueous layer was separated and discarded. To remove excess dimethylamine from the red oil, which was crude m-(dimethylamino)phenol, it was steam distilled and the steam distillate was treated with sodium chloride to cause separation of the m-(dimethylamino)phenol from the aqueous layer again as a red oil. This oil was distilled under reduced pressure. The fraction distilling at 171–175° C. at 28 mm. solidified on cooling. This product, a white waxy solid which melted at 65–72° C., was m-(dimethylamino)phenol of about 88 percent purity. This product was used as an intermediate for the preparation of 4-methyl-7-dimethylaminocoumarin.

EXAMPLE 2 m-(Dimethylamino)Phenol

Following the manipulative procedure of part A of Example 1 but using the resorcinol, dimethylamine, and boric acid in approximate respective molar proportions of 1:2:1, the yield of crude m-(dimethylamino)phenol was 1000 pounds; using approximate respective molar proportions of 1:1.5:1, the yield was 1010 pounds; using approximate respective molar proportions of 1:1.25:1, the yields in two runs were 1150 pounds and 1070 pounds; using approximate respective molar proportions of 1:1.25:0.5, the yields in six runs were 1160 pounds, 1085 pounds, 1110 pounds, 1170 pounds, 1035 pounds and 1125 pounds; using approximately respective molar proportions of 1:1:0.5, the yield was 1025 pounds; using approximate respective molar proportions of 1:1.25:0.25, the yield was 1170 pounds; and using approximate respective molar proportions of 1:1.25:0.03, the yield was 1200 pounds.

EXAMPLE 3 m-(Diethylamino)Phenol

A mixture of 1320 pounds of resorcinol, 1090 pounds of diethylamine, 90 pounds of boric acid, and 1908 pounds of water is heated at 200° C. in an autoclave with agitation for twelve hours. After cooling and opening the autoclave, and distilling the water and excess diethylamine from the resulting reaction mixture, there is obtained a residue consisting of crude m-(diethylamino)phenol. This product can be purified by fractional distillation under reduced pressure or, if desired, be used directly in the preparation of 4-methyl-7-(diethylamino)coumarin.

EXAMPLE 4 m-(N-Methyl-N-Ethylamino)Phenol

The above-designated product is obtained by following the procedure of part A of Example 1, with the exception that 880 pounds of N-methyl-N-ethylamine and about 1000 pounds of water are substituted for the 1680 pounds of 40 percent aqueous dimethylamine solution.

EXAMPLE 5 m-(Di-n-Propylamino)Phenol

The above-designated product is obtained by following the procedure of part A of Example 1, with the exception that 1510 pounds of di-n-propylamine and about 1000 pounds of water are substituted for the 1680 pounds of 40 percent aqueous dimethylamine solution.

I claim:

1. The process for producing a m-(di-lower-alkylamino)phenol which comprises heating resorcinol, a di-lower-alkylamine, and boric acid together, in the approximate proportions of 0.5–2.0 moles of di-lower-alkylamine and 0.01–1 mole of boric acid per mole of resorcinol, in an aqueous medium at a temperature in the approximate range 150–250° C.

2. The process for producing a m-(di-lower-alkylamino)phenol which comprises heating resorcinol, a di-lower-alkylamine, and boric acid together, in the approximate proportions of 1–1.5 moles of di-lower-alkylamine and 0.02–0.2 mole of boric acid per mole of resorcinol, in an aqueous medium at a temperature in the approximate range 150–250° C.

3. The process for producing m-(dimethylamino)phenol which comprises heating resorcinol, dimethylamine, and boric acid together, in the approximate proportions of 1–1.5 moles of dimethylamine and 0.02–0.2 mole of boric acid per mole of resorcinol, at 175–225° C.

References Cited in the file of this patent

UNITED STATES PATENTS 2,376,112 Bean _____ May 15, 1945

FOREIGN PATENTS 497,947 Canada _____ Nov. 24, 1953
1,222,700 France _____ Jan. 25, 1960